United States Patent [19]
Gutman

[11] 3,750,371
[45] Aug. 7, 1973

[54] APPARATUS FOR SEPARATING LIQUIDS FROM WET STEAM
[75] Inventor: Viktor Heinz Gutman, Winterthur, Switzerland
[73] Assignee: Sulzer Brothers, Ltd., Winterthur, Switzerland
[22] Filed: Dec. 9, 1971
[21] Appl. No.: 206,510

Related U.S. Application Data
[63] Continuation of Ser. No. 882,038, Dec. 4, 1969, abandoned.

[30] Foreign Application Priority Data
Dec. 4, 1968  Switzerland .................. 18071/69

[52] U.S. Cl. .................. 55/419, 55/269, 55/324, 55/487, 55/488, 55/491, 122/483, 122/488
[51] Int. Cl. .......................................... B01d 46/12
[58] Field of Search ...................... 55/267–269, 324, 418, 419, 486–488, 491, 183, 185, 186, DIG. 23; 122/39, 483, 488

[56] References Cited
UNITED STATES PATENTS

| 2,283,201 | 5/1942 | Gillette et al. | 122/491 |
| 2,368,443 | 1/1945 | Bierg | 122/491 |
| 3,477,208 | 11/1969 | Keller, Sr. | 55/466 |
| 3,508,527 | 4/1970 | Durrer | 122/483 |
| 3,547,085 | 12/1970 | Kovacik | 122/491 |
| 3,593,500 | 7/1971 | Ritland et al. | 55/269 |
| 3,656,281 | 4/1972 | Bansal et al. | 55/484 |

FOREIGN PATENTS OR APPLICATIONS
978,465  12/1964  Great Britain .................. 55/490

Primary Examiner—Bernard Nozick
Attorney—Francis C. Hand

[57] ABSTRACT

The apparatus includes a grid-like flow straightening means, a pressure reducer in the form of a perforated plate, and a separator for separating out the liquid. A wire mesh screen is also positioned between the pressure reducer plate and separator to provide an equalizing chamber for the steam leaving the plate.

14 Claims, 3 Drawing Figures

APPARATUS FOR SEPARATING LIQUIDS FROM WET STEAM

This application is a continuation of copending application Ser. No. 882,038, filed Dec. 4, 1969 now abandoned.

This invention relates to an apparatus for separating liquids from wet steam.

Heretofore, it has been known to use liquid separators in installations such as nuclear reactors in which saturated steam must be dried before being suitable for use in a steam turbine.

Briefly, the apparatus for separating liquid from wet steam includes a flow straightening means, a pressure reducer to equalize the velocity distribution across the flow path and a separator each of which are disposed across the flow path of the steam in succession in the direction of flow.

In this arrangement, the combination of the pressure reducer and the flow-straightening means element tends to reduce the speed at which the steam hits the separator. The volume of steam may also be more evenly distributed over the flow cross-section.

Preferably, the pressure reducer comprises a perforated plate and a screen downstream of the plate; the screen having finer perforations and providing a lower pressure drop than the perforated plate.

The invention may be carried into practice in various ways and two embodiments will now be described by way of example with reference to the accompanying drawings of which:

Figure 1:
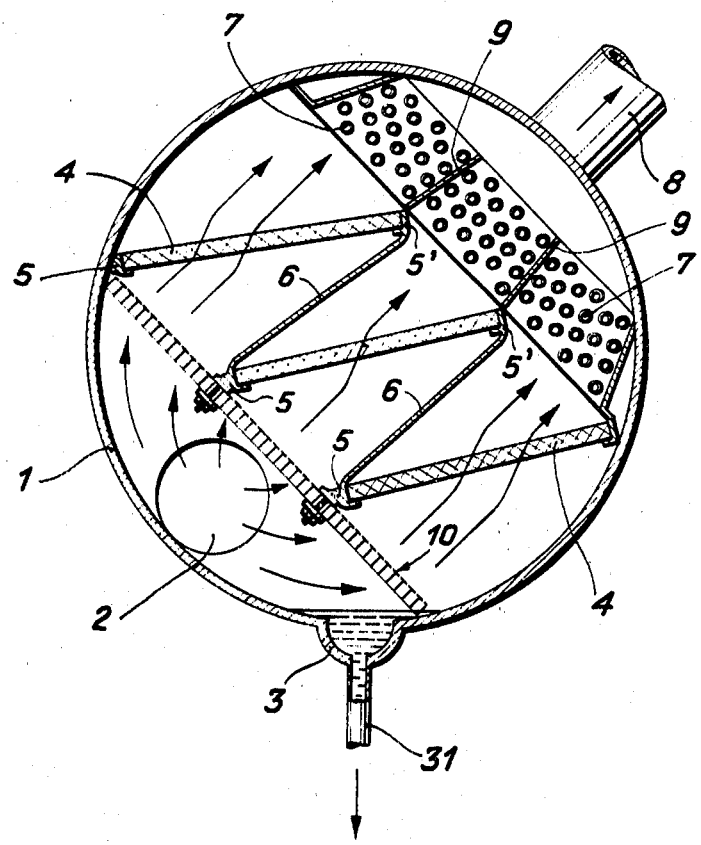
FIG. 1 illustrates a cross-sectional view of an apparatus according to the invention.

Referring to FIG. 1, the apparatus for separating liquid from wet steam is situated within a horizontal cylindrical vessel 1 (as is known) having a steam inlet orifice 2 in its lower portion at one end which is connected, in a manner not shown, to a duct supplying the wet steam which is to be treated in the apparatus. The lowest portion of the vessel 1 has a cup-like protuberance 3 in which the separated liquid collects and which communicates with a liquid discharge duct 31. A plurality of plate-like separators 4 are for the separation of liquid from the steam passing therethrough positioned inside the vessel 1 each of which consists of layers of metal fibers or wire, which may, for example, be woven to form a metal fabric, and which extend over substantially the whole horizontal length of the vessel 1. The separators 4 are arranged in steps to form three tiers and are supported at their edges on portions 5, 5' which are suitably attached to partitions in the vessel 1. The separators 4 can be extracted from the vessel 1 by moving axially, since one end wall is either completely detachable or contains one or more removable portions. Between the top and center separators 4 and between the center and bottom separators 4 there are baffles 6, connected to the portions 5, 5' in such a way as to produce three parallel flows of vapor.

The vessel 1 also houses tube assemblies 7, which consist of tube coils extending in a direction parallel to the longitudinal axis of the vessel. A heating medium is passed through the tube coils so that the steam flowing thereover is superheated after flowing through the separators 4. The superheated steam leaves the vessel 1 through one or more spigots 8 and flows to a load (not shown). The tube assemblies 7 are divided by baffles 9 into three groups, so that each of the three parallel flows of vapor is associated with one group of tube assemblies 7.

Between the steam inlet orifice 2 and the separators 4 lies a device 10 which consists of a pressure reducer and a flow-straightening element, and by means of which the speed of the wet steam supplied is reduced and equalized over the flow cross-section before entering the separators 4.

Figure 2:
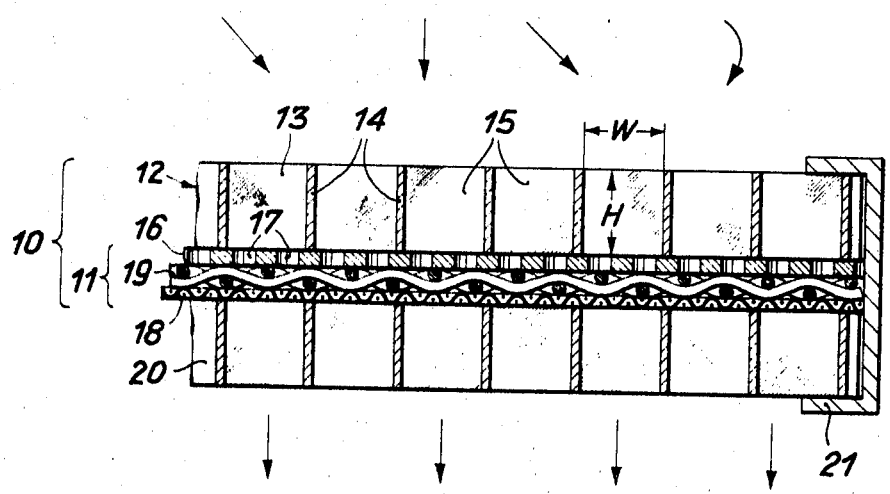
FIG. 2 illustrates a view of a part of the apparatus on a larger scale.

Referring to FIG. 2, the device 10 includes a grid-like straightening element 12 situated directly in front of the pressure reducer 11 as viewed in the direction of flow of the wet steam. This straightening element 12 is made up of flat sections 13 extending in the longitudinal direction and flat sections 14 extending in the transverse direction, thus forming chambers 15 of square cross-section. The depth H of each chamber 15 is slightly greater than its internal width W. The pressure reducer 11 is in three parts comprising a plate 16 with perforations 17 distributed evenly over the entire area of the plate 16, a fine wire gauze 18 and a flat spacer element 19. The perforations 17 in the plate 16 are arranged to provide at least one perforation 17 for each chamber 15, for example, each chamber 15 has four perforations 17. The fine wire gauze 18 has a larger number of perforations per square centimeter than the perforated plate 16. The spacer element 19 consists of very loosely woven wire netting.

The dimensions of the pressure reducer 11 are such that the perforated plate 16 produces the greatest pressure drop. The spacer element 19 provides an equalizing chamber for the steam leaving the plate 16, before this steam passes through the fine wire gauze 18. As the steam flows through the gauze 18, the flow is further stabilized. A support 20 downstream of the pressure reducer 11 is built up in the same way as the straightening element 12 and cooperates with the element 12 to hold the three parts of the pressure reducer 11 together. The straightening element 12, pressure reducer 11 and support 20 are held at the edges in a frame 21 and can therefore be inserted in or removed from the vessel 1 as a single unit. Alternatively, however, the frame may be omitted.

Figure 3:
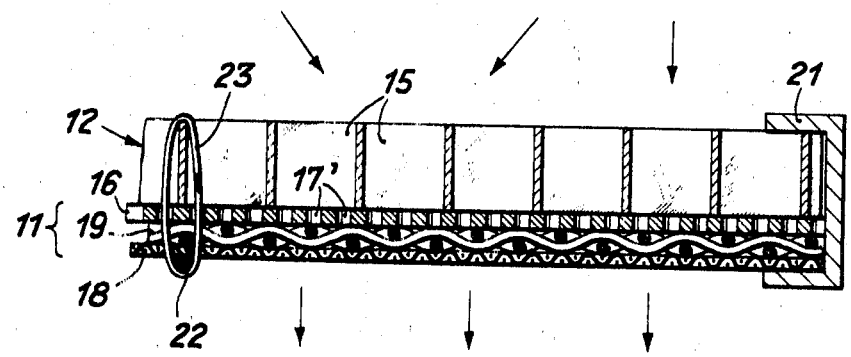
FIG. 3 illustrates a view similar to that in FIG. 2 of a second form of apparatus.

Referring to FIG. 3, the perforated plate 16 used in the pressure reducer 11 can have perforations 17' which are more closely spaced than those in the embodiment shown in FIG. 2. For example, each chamber 15 has nine perforations 17', which, moreover, are smaller in diameter than the perforations 17 above. Also, the support element 20 is replaced by support rods 22 which are held by wire loops 23 to the straightening sections H (only one rod 22 and one loop 23 being illustrated). The wire in each loop 23 runs through the meshes of the wire gauze 18 and spacer element 19 and through the perforations 17' and chambers 15. In this embodiment, the straightening element 12 also acts as a load-bearing support element to support the pressure reducer 11 thereon.

What is claimed is:

1. An apparatus for separating liquids from wet steam comprising first means defining a flow path for a wet steam;

a flow straightening means disposed within said first means in said flow path, said flow straightening means including a plurality of transversely disposed flat sections defining chambers therebetween of a depth slightly greater than the width thereof;

a pressure reducer downstream of said flow straightening means with respect to said flow path for equalizing the velocity distribution of the steam across said flow path, said pressure reducer being disposed across said chambers of said flow straightening means; and a separator downstream of said pressure reducer for separating liquid from the steam in said flow path passing therethrough.

2. An apparatus for separating liquid from wet steam comprising a housing defining a flow path for wet steam and having an inlet for said wet steam, a first outlet for steam and a second outlet for liquid water;

a planar grid disposed within said housing in said flow path, said planar grid including a plurality of transversely disposed flat sections defining chambers therebetween of a depth greater than the width thereof, each said chamber having an inlet opening exposed to said flow path for receiving a part of the wet steam;

a pressure reducer downstream of said planar grid with respect to said flow path for equalizing the velocity distribution of the steam across said flow path, said pressure reducer being disposed across said chambers of said planar grid and including a plate in contact with said flat sections and having discrete perforations communicating with said chambers to throttle the flow therethrough; and a separator downstream of said pressure reducer for separating liquid from the steam in said flow path passing therethrough.

3. An apparatus as set forth in claim 12 wherein said pressure reducer further includes a screen downstream of said plate, said screen having perforations of smaller size than said perforations in said plate to provide a lower pressure drop in the flow of wet steam than said plate.

4. An apparatus as set forth in claim 3 wherein said screen is a wire mesh.

5. An apparatus as set forth in claim 3 further comprising a flat spacer element between said plate and said screen.

6. An apparatus as set forth in claim 5 wherein said spacer element comprises loosely woven wire mesh.

7. An apparatus as set forth in claim 2 further comprising a support downstream of said pressure reducer for supporting said pressure reducer thereon.

8. An apparatus as set forth in claim 2 which further comprises a frame supporting said pressure reducer and said planar grid to form a single unit.

9. An apparatus for separating liquid from wet steam comprising a housing defining a flow path for a wet steam and having an inlet in said housing for said wet steam, an outlet for steam and an outlet for liquid water;

a planar grid extending across said flow path downstream of said inlet and including a flow straightening grid having walls extending transversely of each other to define apertures through said grid of a depth greater than the width thereof;

a perforated plate extending across and superimposed on said grid having apertures distributed evenly across said plate, at least one of said apertures communicating with each one of said apertures of said grid; said apertures in said plate being of smaller diameter than the apertures in said grid; and plate-like separators extending across said flow path between said perforated plate and said outlet for steam to separate liquid from the steam.

10. An apparatus as set forth in claim 9 comprising a means for collecting separated liquid in said housing and a liquid discharge duct communicating with said means and said outlet for liquid water.

11. An apparatus for separating liquid from wet steam comprising first means defining a flow path for a wet steam;

a flow straightening means disposed within said first means in said flow path, said flow straightening means including a plurality of transversely disposed flat sections defining chambers therebetween of a depth greater than the width thereof;

a flat shaped element having a plurality of discrete perforations in abutment with said flow straightening means on the downstream side thereof with respect to said flow path for equalizing the velocity distribution of the steam across said flow path, said element being disposed across said chambers of said flow straightening means and having at least one of said discrete perforations communicating with a respective one of chambers to throttle the flow therethrough; and a plate-like separator of woven-fabric disposed across said flow path downstream of said element for separating liquid from the steam in said flow path passing therethrough.

12. An apparatus as set forth in claim 11 which further comprises a fine wire gauze connected to said flat shaped element downstream thereof.

13. An apparatus as set forth in claim 12 wherein said fine wire gauze and said flat shaped elements are connected to said flow straightening means.

14. An apparatus as set forth in claim 12 which further comprises a grid like support abutting said fine wire

* * * * *

UNITED STATES PATENT OFFICE
CERTIFICATE OF CORRECTION

Patent No. 3,750,371   Dated August 7, 1973

Inventor(s) Viktor Heinz Gutman

It is certified that error appears in the above-identified patent and that said Letters Patent are hereby corrected as shown below:

Column 3, line 35, "12" should be --2--.

Column 4, line 54, after "wire" insert

--gauze on the downstream side of said fine wire gauze.--

Signed and sealed this 22nd day of January 1974.

(SEAL)
Attest:

EDWARD M. FLETCHER, JR.          RENE D. TEGTMEYER
Attesting Officer                 Acting Commissioner of Patents